Nov. 2, 1965    R. G. BEAVERS ETAL    3,214,905
VARIABLE AREA CONVERGENT-DIVERGENT NOZZLE
Filed Nov. 28, 1960    2 Sheets-Sheet 1
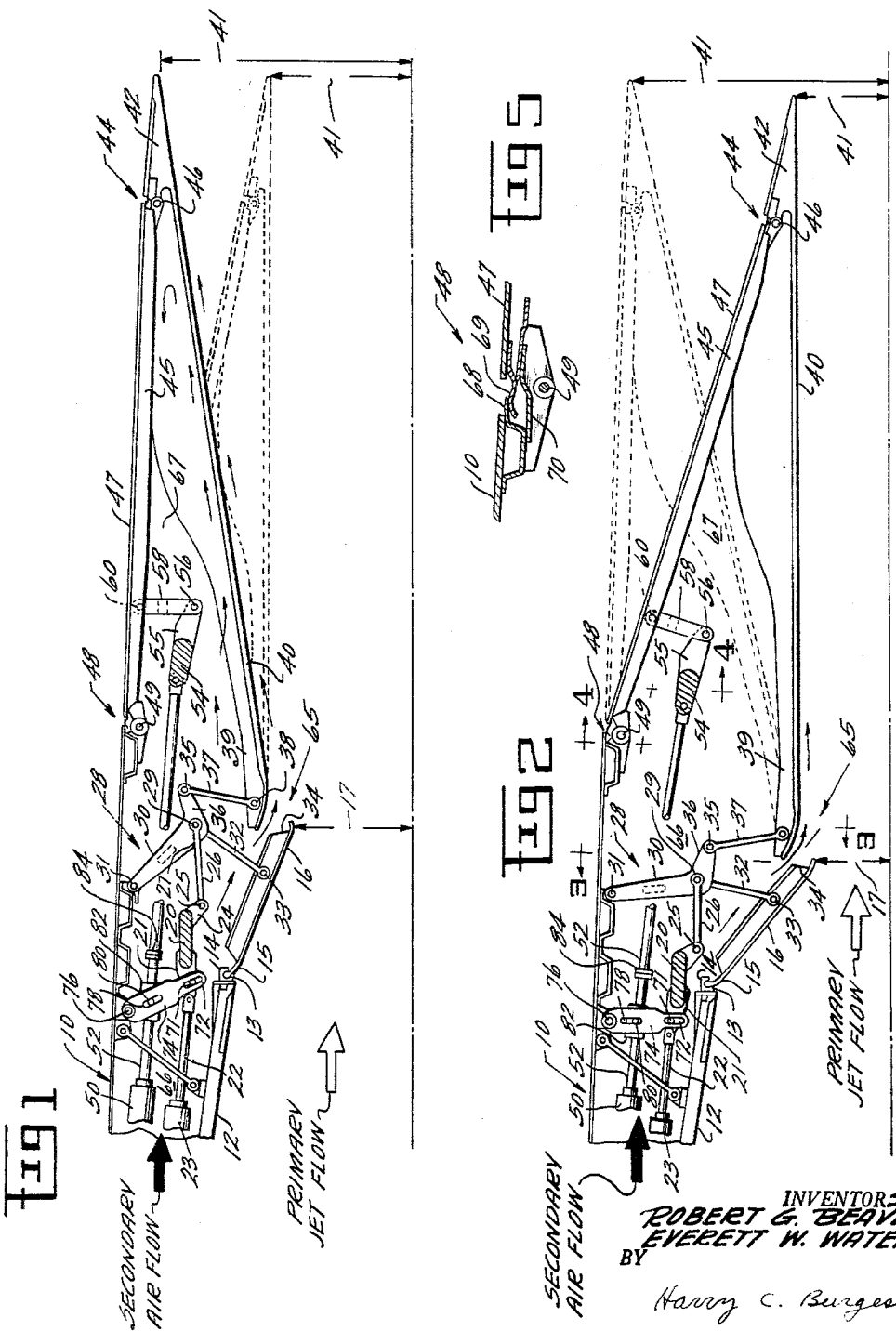
INVENTORS.
ROBERT G. BEAVERS
EVERETT W. WATERS
BY
Harry C. Burgess
ATTORNEY-

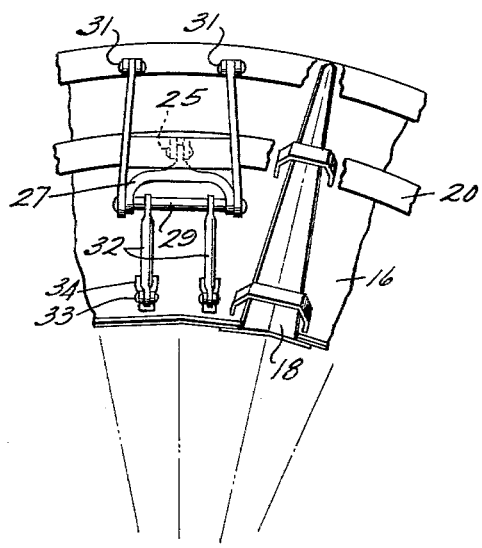
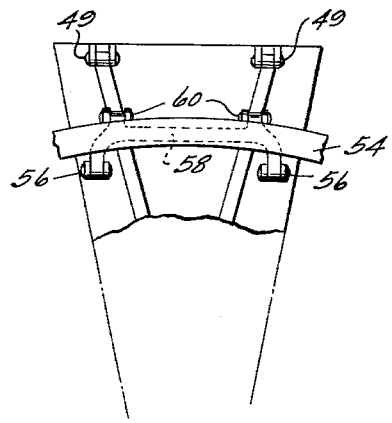

United States Patent Office
3,214,905
Patented Nov. 2, 1965

3,214,905
VARIABLE AREA CONVERGENT-DIVERGENT NOZZLE
Robert G. Beavers, Mason, Ohio, and Everett Wilber Waters, Lynnfield, Mass., assignors to General Electric Company, a corporation of New York
Filed Nov. 28, 1960, Ser. No. 72,249
5 Claims. (Cl. 60—35.6)

This invention relates to a convergent-divergent nozzle for use with an aircraft jet engine and, more particularly, to a variable area convergent-divergent nozzle including movable members capable of assuming a wide range of positions, the nozzle having a controllable secondary air flow for all such positions.

With the increasing interest in power plants for high Mach supersonic flight, e.g., turbo-ramjets, pure ramjets and rockets, it has become increasingly important to provide means for optimizing engine operating efficiency under dissimilar flight conditions. For example, it is known that for subsonic operation an efficient type of jet exhaust nozzle is a nozzle having a convergent shape. However, at near sonic and at supersonic speeds it is more desirable to employ a nozzle having a convergent portion followed by a divergent portion. For most efficient operation it is also desirable to provide means to vary both the minimum flow area, or throat, of the convergent portion of the nozzle and the nozzle exit area at the downstream end of the divergent portion. This is for the reason that, as the ratio of the pressure upstream of the throat to the pressure downstream of the throat increases, it is necessary to increase the ratio of the exit area to the throat area if efficient expansion is to be obtained. Such a nozzle configuration is especially desirable when the engine utilizes a system of thrust augmentation, or afterburning, wherein fuel is injected and burned downstream of the turbine area with the resulting further expansion of the gases. This, ideally, calls for a further increase in the nozzle throat area. Thus, when a convergent-divergent nozzle is operated at other than the design level, e.g., at take-off or with afterburning, it is necessary to provide considerable variation in the ratios of the throat-to-exit areas for proper control of the engine.

Various convergent-divergent nozzles have been proposed having movable members which can vary the effective areas of the convergent and divergent portions. These proposed nozzles, however, have essentially been "two-position" nozzles, i.e., they usually have included only two sets of movable members which are usually set for maximum efficiency at either subsonic or take-off conditions, or at supersonic or cruise conditions. In between these extremes, however, this type of nozzle operates at less than the desired efficiency. The result can be a marked increase in losses due, for example, to overexpansion in the divergent portion which can cause the pressure to drop below atmospheric, followed possibly by flow separation and turbulence. There is a need, therefore, for adjustability over a wide range of flight conditions, including high supersonic speeds, where the ram effect is great, and at take-off, where ram is nil. A control system for such a nozzle obviously requires great flexibility. Some of the known control systems which have been used to provide the desired operation for conventional convergent-divergent nozzles usually have had inherent disadvantages resulting from the weight and complexity necessary to provide the needed flexibility. It would seem desirable, therefore, to design a control system of less weight and complexity, which would also be less expensive to construct and easier to maintain. Such a system is shown and described in the co-pending application of Bailey et al., Serial No. 72,248, entitled "Improved Variable Area Convergent-Divergent Nozzle and Actuation System Therefor," filed of even date herewith, and assigned to the assignee herein.

As a result of thrust augmentation apparatus being utilized by many of our present day aricraft, in particular, military aircraft, it is also desirable, due to the high temperatures associated with use of such apparatus, to provide some means for cooling the interior of the nozzle, especially the divergent portion. Since, as discussed above, such a nozzle should be infinitely adjustable over a wide range of operating conditions, the means for cooling, i.e., providing secondary air flow, should be controlled or scheduled so that a continuous and, at all times, sufficient air flow is provided. In addition, it would be advantageous if the secondary or cooling air flow could be controlled in such a way as to help obtain optimum engine performance by its effect on mass flow exiting from the nozzle. It is necessary, however, and means must be provided to insure that the exit area of the nozzle does not inadvertently become the nozzle "aerodynamic" throat, i.e., become smaller than the normal throat, or geometric minimum, area of the nozzle. If this were to occur it could cause reversal of the secondary air flow and, depending on where the flow is coming from, a resultant blowback of hot gas into an area containing easily damaged parts or equipment.

Accordingly, it is an object of our invention to provide a variable area convergent-divergent jet engine exhaust nozzle having improved efficiency over a wide range of subsonic and supersonic operating conditions.

A further object of our invention is to provide a variable area convergent-divergent jet engine exhaust nozzle including means for assuring a continuous volume of cooling air flow across the interior surface of the divergent portion of the convergent-divergent nozzle over a wide range of operating conditions.

Still another object of our invention is to provide a jet engine exhaust nozzle having independently or simultaneously variable convergent and divergent portions and means for providing a flow of secondary cooling air over the divergent portion which flow is continuous towards the nozzle exit whatever the adjustment of either or both of the convergent-divergent nozzle portions.

A still further object of our invention is to provide a variable area convergent-divergent exhaust nozzle for use with a jet engine including an afterburner, said nozzle having a flow of secondary air scheduled as a function of the convergent-divergent variation which helps to increase engine efficiency and also to cool the divergent portion of the nozzle.

Briefly, our invention comprises a convergent-divergent variable area exhaust nozzle for a jet engine including an exhaust duct, an outer housing spaced about the duct and forming a secondary air pasage therewith, and an air inlet in the passage, the nozzle including a first plurality of movable members forming the convergent portion of the nozzle and defining a throat area thereof and a second plurality of movable members forming the divergent portion of the nozzle and defining the exit area therefor. The upstream ends of the second plurality of movable members are spaced from the downstream ends of the first plurality to provide an annular air gap therebetween. A third plurality of movable members are pivotally hinged to the outside surfaces of the members of the second plurality forward of the trailing edges thereof, and to the engine housing, so as to cooperate with the second plurality to vary the nozzle exit area either independently, or in concert with vibration of the throat area, through use of suitable actuation means.

These and other objects and advantages of our invention will become more apparent and better understood when the following specification is read in connection with the drawings in which:

FIG. 1 is a side elevation, partly in cross section, illustrating one embodiment of our variable area, convergent-divergent jet engine exhaust nozzle, the solid lines showing the nozzle member positioned for supersonic operation of the engine; and FIG. 2 is a side elevation, partly in cross section, of the nozzle of FIG. 1 showing the nozzle positioned for subsonic operation of the engine; and FIG. 3 is an end view taken along line 3—3 of FIG. 2 and illustrating one embodiment of means for actuating the primary or first plurality of movable members of the convergent portion of the nozzle shown in FIG. 2, and for regulating the annular gap; and FIG. 4 is an end view taken along line 4—4 of FIG. 2 and illustrating one embodiment of means for actuating the second and third plurality of movable members of the divergent portion of the nozzle; and FIG. 5 is an enlarged sectional side elevation, partly in cross section, of a type of substantially gas-tight seal for use with the movable members shown in the drawings.

Referring now to the drawings, indicated at 10 in FIG. 1 is a half-section of the rear portion of a housing in which is mounted a jet engine (not shown). Concentrically positioned inside the housing is an engine exhaust duct or tailpipe 12 which terminates in a bracket 13 having a groove 14 located therein. The groove is adapted to receive hinge portions 15 of a plurality of longitudinally-extending movable members of flaps, one of which is shown at 16. This first plurality of flaps or fingers is circumferentially arranged around the end of the tailpipe and forms the convergent portion of the convergent-divergent nozzle by defining the throat area thereof indicated at 17. As shown in FIG. 3, axially-extending seals 18 of a suitable design are associated with the members of this first plurality to form a flow passage for the primary or thrust-producing engine exhaust jet indicated by the large arrows in the drawings.

The diameter of the throat area of the convergent-divergent nozzle may be varied by a control system including a first actuation means provided with a circumferentially-extending unison ring 20 having an elongated portion 21 operatively connected by a rod 22 to an actuator 23. Although only one actuator 23 is shown, it is understood that more than one could be used and that any suitable type of linear actuator is acceptable. The unison ring also includes a plurality of generally axially-directed extensions, one of which is shown at 24. Attached to each extension by a means of pivot bolt and clevis arrangement 25 is an intermediate connecting link 26 having a forked end 27. The link connects the unison ring to a bifurcated bell crank, indicated generally at 28, by means of an elongated pivot bolt 29. As shown in the drawing, the elongated upper arm 30 of each half of the bell crank is suitably attached to the housing, as by a pivot bolt 31, there being one bifurcated bell crank for each movable member 16. To enable motion of the bell cranks to be transmited to this first plurality of flaps, one end of each link of a pair of connecting links 32 is pivotally attached to the elongated bolt 29 located at the apex of the crank arms. The other ends of these connecting links are pivotally attached by bolts 33 to reinforcing member or ribs 34 secured to the outer surfaces of the convergent or primary flaps 16. It will be obvious from the foregoing that, as the actuator 23 moves the rod 22 forwardly or rearwardly of the engine, the unison ring 20 will also move axially, causing the bell cranks to pivot on the bolts 31 to move the primary flaps radially inwardly or outwardly about the flap hinges 15. Thus, the throat of the convergent-divergent nozzle can be adjusted to present the desired flow area for the main thrust-producing jet.

Pivotally attached at 35 to each of the lower arms 36 of the bell cranks 28, is one end of each of a second pair of connecting links 37. The other ends of these latter connecting links, are in turn pivotally attached by bolts 38 to ribs or strengthening members 39 on the upper or outer surfaces of a plurality of elongated, internal movable flaps, one of which is shown at 40. This second set of flaps helps form the divergent portion of the convergent-divergent nozzle, the downstream ends of the flaps defining the exit area 41 of the convergent-divergent nozzle. It will be noted that each downstream end includes a web portion 42. Located at the forwardmost or upstream part of the web is a hinge arrangement, indicated generally at 44. The hinge includes a pivot bolt 46 and substantially gas-tight sealing means, as is more particularly describe below. Each hinge 44 is also attached to a rib or strengthening member 45 on each of the pivotally movable members of a third plurality, one of which is shown at 47. Each finger or flap 47 is pivotally attached at its forwardmost point to the housing 10 by means of a second hinge arrangement, indicated generally at 48. Each of these latter hinge arrangements include a pair of pivot bolts 49 and a substantially gas-tight seal arrangement, as is best seen in FIG. 5.

It will be realized that the second and third pluraility of movable members are designed to cooperate in varying the exit area and the divergent portion of the nozzle. Suitable actuation linkage, similar to that described above, is provided to move the latter members. In the embodiment shown in the drawings, this comprises a second actuator 50 pivotally connected by means of a rod 52 to a second unison ring 54. The second unison ring extends circumferentially around the nozzle between the inner and outer flaps of the divergent portion and includes a plurality of generally axially-directed, bifurcated extensions 55. Pivotally attached by bolts 56 to each of the arms of the bifurcated extensions 55 is one pair of ends of a generally H shaped connecting link 58. The other ends of each H shaped link are pivotally connected by bolts 60 to an outer divergent flap rib member 45. It will be clear from the foregoing that as the actuator 50 moves rod 52 forwardly or rearwardly at the engine, the unison ring 54 will move axially to cause the downstream ends of flaps 47 and 40 to move radially inwardly or outwardly of the engine. It is also to be noted that the divergent portion of the convergent-divergent nozzle may be varied independently of the convergent or primary portion since the internal flaps 40 are free to pivot about point 35, and hinge 44, without movement of the bell crank 28 such as would cause the primary flaps to move, and without any interference with the latter flaps.

In order to assure proper operation of the linkage type actuation system described above, there should be some provision for maintaining the circumferentially-extending unison rings 20 and 54 concentric with the engine centerline, otherwise the thrust axis of the engine could rotate slightly or the linkage itself might interfere and bind. This is accomplished in the present system by the particular arrangement of the bifurcated bell cranks 28, pivot points 29 and 31, H shaped links 58, and pivot points 56 and 60, which partake of A frames appropriately adapted for use as centering devices, as is best shown in FIGS. 3 and 4. This arrangement is part of the Bailey et al. invention and is more fully described in the above-referenced co-pending application thereof.

Another novel feature of our invention will also be seen in FIGS. 1 and 2. This is the provision for the air gap indicated generally at 65. The air gap is adapted to be adjusted, or scheduled, to provide a controlled, continuous cooling annulus of air under a variety of conditions of engine operation, as a function of the adjustment of the exit area or the throat area. This can be important in an aircraft installation since it would be desirable to provide cooling air for the housing, in addition to the engine, and especially for the elongated interior surfaces of the flaps 40 which may be subjected to severe high temperature conditions at take-off and under emergency military operation (when the afterburner or thrust augmentation means is utilized). It will be noted from the drawings that the actuation system linkage, including the bell cranks 28, and connecting links 26, 32, 37, and 58, is arranged so that the area of the gap 65 can be controlled during movement of the secondary divergent flaps and the primary convergent flaps, either in unison or independently. Thus, a continuous pumping or ejector action is maintained at all times. And, in addition, by insuring that the gap 65 is always large enough to allow a flow of air in excess of that needed for cooling, at least two benefits can occur. First, it should be noted that where the engine inlet duct is sized for the best and most efficient operation during high supersonic cruise, the air supplied is in excess of that needed at lower speeds. By permitting this excess air to flow through a passage 66 between the housing 10 and the engine tailpipe 12 and, thence, through the gap 65, spillage or aerodynamic drag, which would ordinarily occur because of the "oversize" inlet can be reduced or substantially eliminated. Secondly, this additional air not needed at the lower cruising speeds will be expanded in the secondary portion of the nozzle. This enables a more efficient engine operation to be achieved. This, and other arrangements of the actuation system linkage, is more fully described in the co-pending Bailey et al. application.

Referring more particularly to FIG. 2 where the nozzle is shown in the subsonic or minimum exit area setting, this mode of operation is achieved by the above-described movement of the actuation linkages which, in this case, also controls the movement of the primary and secondary flap or fingers. It may be evident from a comparison of the drawings that the gap area is slightly increased in FIG. 1. This is because the actuation system linkage and the sets of flaps are so arranged and constructed that the gap area will increase slightly when the nozzle throat area is decreased, while the nozzle exit is held fully open, or nearly so. The result is that the flow through the annular secondary air gap is maximized, regardless of the nozzle throat area, when the nozzle exit area is at a *maximum*. On the other hand, when the throat is opened, with the exit at a maximum, the gap is preferably made slightly smaller in area. If the nozzle exit area is then reduced, with the nozzle throat being held open, the area of the gap 65 will again be slightly reduced. This is appropriate aerodynamically since such a position is used when the ratio of the upstream pressure to downstream pressure is reduced, such as during subsonic or take-off conditions of aircraft operation. As the source of secondary air is, in most cases, likely to be in inlet duct ahead of the main portion of the engine, the secondary air cools the external surfaces of the engine casing (not shown) as well as the housing, tailpipe and the nozzle internal secondary flaps. Thus, the nozzle is able to accommodate more secondary air flow than is actually required for cooling by means of the controlled air gap feature and there is provided an efficient means of utilizing excess air coming through the inlet duct of the aircraft.

The reasons for the gas-tight seals at 44 and 48 should now be apparent. These seals, in conjunction with axially-extending seals (similar to the seals 18 shown in FIG. 3) located between each of the individual divergent flaps or fingers 40 and 47 help to enclose the area between the internal and external flaps and cooperate therewith to form a substantially gas-tight cavity indicated at 67. Secondary air flow, indicated by the small arrows in FIG. 1, will therefore be trapped within this cavity and forced or directed out through the gap 65. This arrangement differs from the prior art nozzles wherein an uncontrolled leakage of air, at best, is provided, either at the downstream end of the nozzle or between sets of flaps, or both. FIG. 5 is illustrative of one type of gas-tight hinge sealing means which can be used to obtain this desired maximizing of the secondary air flow. The hinges in this embodiment include a plurality of slidingly engageable, spring-like elements, 68, 69, and 70, attached to a pair of movable members, or to a member and associated supporting structure. Since it is desirable to make the trailing edge of the divergent inner flap as small as possible the hinges are preferably placed on the outside of the divergent portion of the nozzle and forward of the trailing edge. A smooth surface is therefore presented to the flow internally of the nozzle and, by means of the seal configuration shown in the drawings, the outside of the flaps 47 present a substantially smooth continuation of the housing 10. Also, placement of the hinge points as shown makes for a wider variation in the angle between the external and internal secondary flaps than heretofore possible with known devices. This insures optimum performnce at all conditions of flight from take-off to high Mach cruising speeds operation, as the infinite number of adjustments of the independently variable exit area, which results from such an arrangement, enables maximum utilization of the increases in the ratio of the upstream to the downstream (of the throat) pressure which occurs as speed increases, as explained above.

It will also be noted from the drawings that the inner flaps are slightly longer than the outer flaps, i.e., the distance from pivot points 38, or the downstream ends of the inner flaps to the web portion 42 is slightly greater than the distance between the hinges 44 and 48. This arrangement, in combination with the location of the hinges, is adapted to help obtain a balanced gas-dynamic load on the actuation system for the primary and secondary members as explained in the aforementioned co-pending application of Bailey et al.

As stated above, in the operation of a fully variable convergent-divergent jet engine nozzle it is important and necessary that the flow area of the nozzle throat be kept smaller than the flow area at the nozzzle exit to prevent possible damage to the engine through turbine wheel over-temperaturing or reversed secondary flow through gap 65. This highly undesirable condition could occur in the event of a control system failure of either a permanent or transitory variety. Therefore, an auxiliary safety linkage is incorporated in the actuation system embodiment shown in FIGS. 1 and 2. The safety linkage comprises a pin 71 which protrudes from the elongated portion 21 of the unison ring 20. The pin is adapted to slide in a first slot 72 in a link 74. The link is pivotally connected at 76 to the housing or nacelle 10. A second slot 78 is provided in the link, into which is inserted a second pin 80. This pin is rigidly affixed to a collar 82 which is adapted to slide on the secondary actuator rod 52. Fastened on the rod are a pair of adjustable stop nuts 84. As actuator 23 moves rod 22 to adjust the convergent portion of the nozzle, collar 82 will ride back and forth on rod 57. With both of the unison rings being in the minimum area, or forward, positions, as shown in FIG. 2, it will be apparent that as unison ring 20 moves aft, link 74 will rotate about point 76 and cause collar 82 also to slide aft. Then if unison ring 54 has not moved, e.g., by reason of failure of the power system collar 82 will eventually strike the stop nuts 84 and force the ring to move, thus increasing both the nozzle exit areas and throat areas. The collar is so located on rod 54 as to cause the above fail-safe action to occur whenever the throat area is almost as big as the exit area, i.e., the throat is never allowed to become larger than the exit. Engagement of the safety linkage at an approximately constant ratio of exit area to throat area is achieved by the proper location of slots 72 and 78 in the link 74. This and other safety linkage arrangements are more fully described in the aforementioned co-pending application of Bailey et al., Serial No. 72,248, of common assignment.

The invention will therefore be seen to embody an improved convergent-divergent type of nozzle having three pluralities of movable members for independent variation of throat and exit areas, and secondary or cooling air flow to provide optimum increase operating efficiency over a wider range of operating conditions than has heretofore been possible with existing nozzles of this general type. Furthermore, an actuation or control system for use with this improved nozzlze can be of greatly simplified design, such as is shown in the aforementioned co-pending application Serial No. 72,248, with all the obvious advantages, even though the system must be capable of controlling independently three sets of nozzzle flaps in a manner such that convergent, or primary, and the divergent, or secondary flaps are fully variable to permit the above-described modes of operation. All embodiments of a convergent-divergent nozzle having three sets of movable members and having a scheduled air gap, as described herein, that will suggest themselves to those skilled in the art are intended to be covered by the claims of this application. Although the contours of the convergent flaps are shown as being straight, obviously other shapes are suitable. Further, the exact sizes of the pluralities of movable members may vary from application to application. In addition, further means for actuating the movable members, as are described in the above-mentioned co-pending application of common assignment, are equally suitable for use with the invention shown herein.

We claim:

1. A variable area convergent-divergent exhaust nozzle for an aircraft jet engine having a primary exhaust duct and an outer housing, said nozzle including:
    a first plurality of longitudinally-extending movable members forming the convergent portion of said nozzle, the downstream ends of said first plurality of movable members defining a variable throat area for said nozzle;
    a second plurality of longitudinally-extending movable members forming a divergent portion of said nozzle, the downstream ends of said second plurality of movable members defining a variable exit area for said nozzle;
    a third plurality of longitudinally-extending movable members, each of the members of said third plurality being pivotally attached at one end to said second plurality adjacent the downstream ends of the members of said second plurality, and at the other end to said outer housing;
    an air inlet for said engine providing a source of secondary air between the duct and housing;
    an annular air gap formed by the downstream ends of said first plurality and the upstream ends of said second plurality of movable members, respectively
    wherein as the downstream ends of said first plurality of movable members are adjusted to vary the throat area the upstream ends of said second plurality of movable members are movable in the same direction to maintain the area of said gap substantially constant at high and intermediate exit-to-throat area ratios and slightly reduced at such lower ratios in order that secondary air flows through said gap in a manner such that an optimum amount of cooling air is supplied when said convergent-divergent nozzle is either fully open or fully closed.

2. A variable area convergent-divergent exhaust nozzle for an aircraft jet engine including a primary exhaust duct, an outer housing spaced about said duct and forming a secondary air passage therewith, and a source of secondary air for said passage, said nozzle comprising:
    a first plurality of axially-extending movable members forming the convergent portion of said nozzle, the downstream ends thereof defining a variable throat area for said nozzle;
    a second plurality of axially-extending movable members forming a divergent portion of said nozzle, the downstream ends thereof defining an exit area for said nozzle;
    a third plurality of axially-extending movable members, each of the members of said third plurality being pivotally attached at one end to said second plurality adjacent the downstream ends of the members of said second plurality, and at the other end to said outer housing;
    an annular air gap provided between the downstream ends of said first plurality and the upstream ends of said second plurality of movable members, respectively,
    wherein the amount of secondary airflow through said gap is controllable as a function of the adjustment of the convergent and divergent portions of said nozzle.

3. The invention as described in claim 2 wherein said third plurality of movable members is effective to adjust the position of said second plurality of movable members for varying the exit area of said nozzle independently of the adjustment of the throat area of said nozzle, and
    wherein said throat area is located in the plane of the downstream ends of said first plurality of movable members irrespective of the position of said members when adjusted for varying flight conditions.

4. A variable area convergent-divergent exhaust nozzle for an aircraft jet engine including a primary exhaust duct, an outer housing spaced about said duct and forming a secondary air passage therewith, and a source of secondary air for said passage, said nozzle comprising:
    a first plurality of axially-extending movable members forming the convergent portion of said nozzle, the downstream ends thereof defining variable throat area for said nozzle;
    a second plurality of axially-extending movable members forming a divergent portion of said nozzle, the downstream ends thereof defining an exit area for said nozzle;
    a third plurality of axially-extending movable members, each of the members of said third plurality being pivotally attached at one end to said second plurality adjacent the downstream ends of the members of said second plurality, and at the other end to said outer housing, said third plurality of movable members being effective to adjust the position of said second plurality of movable members for varying the exit area of said nozzle independently of the adjustment of the throat area of said nozzle;
    seal means at the junctions of the members of said second and third pluralities and said third plurality with said housing, and between the movable members of each of said pluralities to provide a substantially gas-tight cavity between said second and third pluralities and;
    an annular air gap provided between the downstream ends of said first plurality and the upstream ends of said second plurality of movable members, respectively, 5. A variable area convergent-divergent exhaust nozzle for an aircraft jet engine including a primary exhaust duct, an outer housing spaced about said duct and forming a secondary air passage therewith, and a source of secondary air for said passage, said nozzzle comprising:
    a first plurality of axially-extending movable members forming the convergent portion of said nozzle, the downstream ends thereof defining a variable throat area for said nozzle;
    a second plurality of axially-extending movable members forming a divergent portion of said nozzle, the downstream ends thereof defining an exit area for said nozzle;
    a third plurality of axially-extending movable members pivotally attached at their upstream ends to said housing and at their downstream ends to said second plurality of movable members externally of said nozzle and adjacent the downstream ends of the members of said second plurality;
    an annular air gap formed by the downstream ends of said first plurality and the upstream ends of said second plurality of movable members respectively, said gap being substantially in the plane of said throat area irrespective of the relative positions of said first or second plurality of movable members under varying flight conditions, and wherein the downstream ends of said first plurality of movable members are adjusted to vary the throat area and, the upstream ends of said second plurality of movable members are movable in the same direction to maintain the area of said annular air gap therebetween substantially constant at high and intermediate exit-to-throat area ratios and slightly reduced at such lower ratios in order that secondary air flows through said gap in a manner such that an optimum amount of cooling air is supplied when said convergent-divergent nozzle is either fully open or fully closed.

References Cited by the Examiner
UNITED STATES PATENTS

| | | | |
|---|---|---|---|
| 2,914,914 | 12/59 | Vandenberg | 60—35.6 |
| 2,926,491 | 3/60 | Hyde | 60—35.6 |
| 2,931,169 | 4/60 | Glenn | 60—35.6 |
| 2,974,481 | 3/61 | Smith | 60—35.6 |
| 2,984,068 | 5/61 | Eatock | 60—35.6 |
| 3,004,385 | 10/61 | Spears et al. | 60—35.6 |
| 3,032,974 | 5/62 | Meyer | 60—35.6 |
| 3,049,873 | 8/62 | Weeks | 60—35.6 |

SAMUEL FEINBERG, *Primary Examiner.*